(12) United States Patent
Hauptmann et al.

(10) Patent No.: US 6,287,361 B1
(45) Date of Patent: Sep. 11, 2001

(54) OIL PUMP GEAR MADE OF ALUMINUM POWDER

(75) Inventors: Guido Hauptmann, Berlin; Helmut Schäfer, Kernen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/606,061

(22) Filed: Jun. 29, 2000

(30) Foreign Application Priority Data

Jun. 29, 1999 (DE) .............................................. 199 29 952

(51) Int. Cl.⁷ ...................................................... B22F 3/12
(52) U.S. Cl. .................. 75/249; 419/26; 419/38
(58) Field of Search ............................ 419/26, 38; 75/249

(56) References Cited

U.S. PATENT DOCUMENTS

| 5,199,971 | 4/1993 | Akechi | 75/249 |
| 5,338,168 | 8/1994 | Kondoh et al. | 418/179 |
| 5,368,629 | * 11/1994 | Kondo et al. | 75/249 |
| 6,089,843 | * 7/2000 | Kondoh | 418/179 |

FOREIGN PATENT DOCUMENTS

| 3-140311 | 6/1991 | (JP) . |
| 3-190950 | 7/1991 | (JP) . |

* cited by examiner

*Primary Examiner*—Ngoclan Mai
(74) *Attorney, Agent, or Firm*—Crowell & Moring LLP

(57) ABSTRACT

In order to keep the losses of a pump caused by oil return flow between the gears and the housing as low as possible at high operating temperatures, the oil pump gears are manufactured from a powdered Al/Si alloy formed by spray compacting, to which approximately 30 weight percent pure aluminum powder is admixed, by pressing and subsequent sintering.

7 Claims, 1 Drawing Sheet

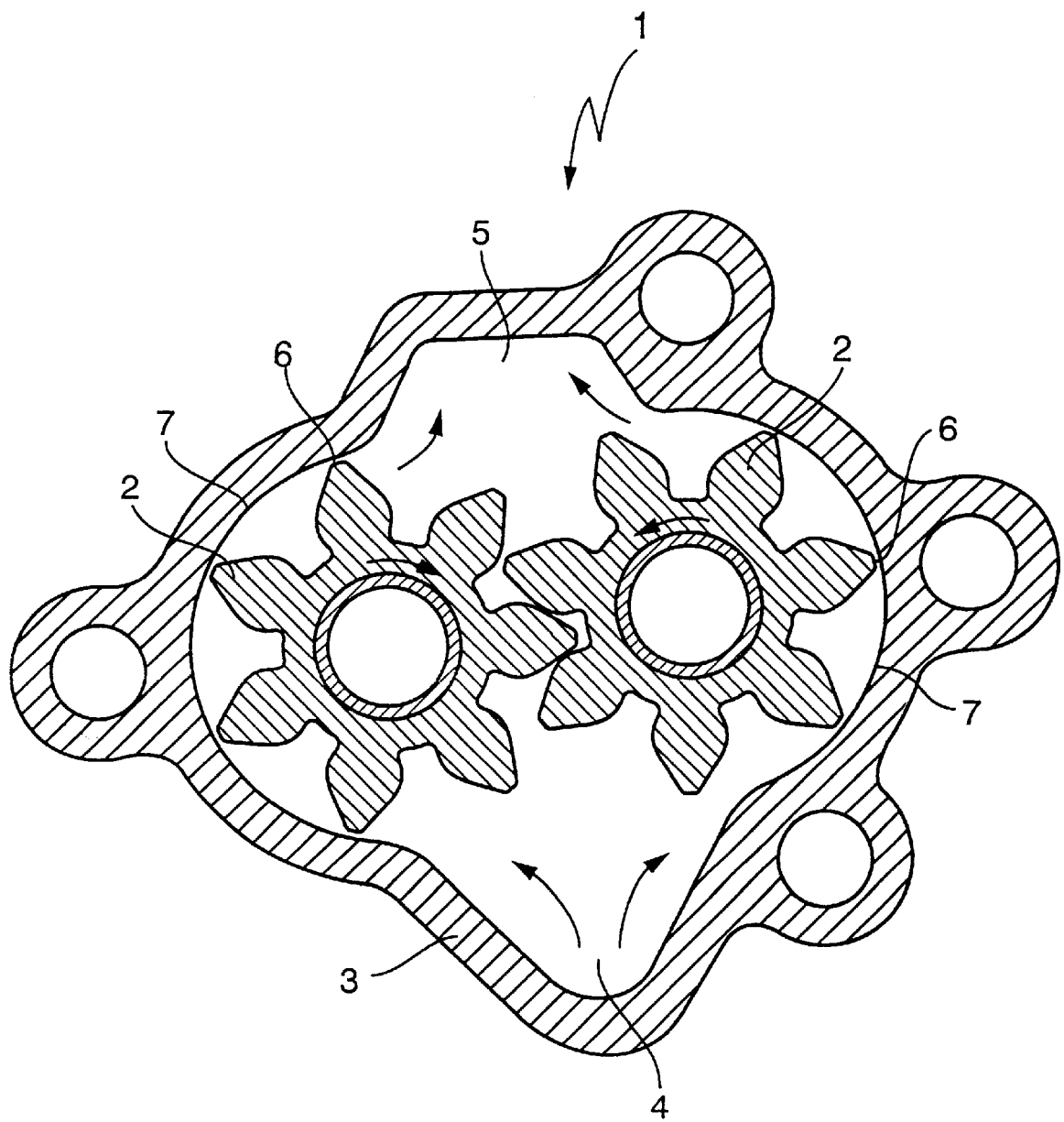

OIL PUMP GEAR MADE OF ALUMINUM POWDER

BACKGROUND OF THE INVENTION

This application claims the priority of German patent document 199 29 952.8, filed Jun. 29, 1999, the disclosure of which is expressly incorporated by reference herein.

The present invention relates to oil pump gears that are manufactured from a powdered aluminum alloy by sintering.

Gear pumps are frequently used as the oil pumps that supply the engine of a motor vehicle with oil. For reducing the weight, light-metal alloys are preferably used as the materials for the oil pumps. As part of the engine (or being arranged in direct proximity of the engine), these pumps are exposed to very high temperatures. To implement the required continuous output of the pump during a long service life while being subjected to considerable temperature fluctuations, the gears must have a high stability; a high resistance to wear; and a high gliding quality (i.e., a low abrasion) between opposed gear pairs. Furthermore, the gears and the housing of the pump should have similar coefficients of thermal expansion to keep the power loss of the pump as low as possible at high temperatures.

Internal-gear pumps made of sintered powdered Al/Si alloys for the use in automobile construction are known, for example, from U.S. Pat. Nos. 5,199,971 and 5,338,168. In the case of the gear pumps described in these patents, the rotor is manufactured by sintering a spray-compacted aluminum alloy that contains 5–25% Si and admixtures of Fe, Ni, and/or Cr. The housing is produced by sintering a spray-compacted aluminum alloy which contains 5–25% Si and admixtures of Cu, Mg, and Mn. These compositions have the purpose of ensuring low wear as well as high mechanical stability at an increased operating temperature. The internal-gear pumps described have an almost identical thermal expansion of the two components as a result of similar compositions of the rotor and the housing. The almost identical thermal expansion keeps the losses of the pump low at higher temperatures.

A process is known from Japanese Patent Document JP 6-65 660A, in which, by hot-forging a mixture of aluminum powder and spray-compacted Al/Si alloy, components are producible which have a low thermal expansion, a high stability, and very low wear characteristics.

However, the components described in U.S. Pat. Nos. 5,199,971, 5,338,168 and Japanese Patent Document JP 6-65 660 A cannot easily be used as gears in an external-gear pump integrated in the cylinder block. The reason is that the gears are disposed in a pump housing which is part of the cast cylinder block and therefore consists of diecast aluminum. The different composition of the materials of the gears and of the housing causes a different thermal expansion of the components of the pump. The result is a widening of the gaps situated between the gears and the housing wall at higher temperatures, which leads to an oil return and to a reduction of the oil quantity delivered during a revolution of the gears. Particularly at high temperatures, such a pump therefore operates with high losses and has to be designed for a high continuous delivery volume.

It is therefore an object of the present invention to provide wear-resistant oil pump gears of a high stability whose coefficient of thermal expansion is adapted to that of cast aluminum in order to implement a low-loss external-gear oil pump that can be integrated in the cylinder block.

This object is achieved according to the present invention. Accordingly, unalloyed aluminum powder in an admixture of between 25 weight percent and 35 weight percent is added to a powdered Al/Si alloy which is produced by spray-compacting and represents the starting material for producing the gears. The thoroughly mixed powdered components are compressed to form a green part of the pump gear and are then sintered. Finally, the sintered part is shaped to the exact geometry of the pump gear by calibration.

As a result of the content of unalloyed aluminum powder according to the present invention, the coefficient of thermal expansion of the gear blank (as well as of the finished gear) is adapted to that of the pump housing which, as part of the cylinder block, is manufactured of diecast aluminum. Because of the adapted thermal expansion of the gears and the housing, the pump losses that result from the return flow of the oil through gaps between the gears and the housing are minimized, particularly at increased temperatures. Thus, an increased efficiency of the pump can be achieved while the space requirement is simultaneously reduced.

Although the admixing of aluminum according to the present invention can also be used for the manufacturing of rotors/housings in internal-gear pumps, it has significant advantages particularly in external-gear pumps. The reason is that, in this case, the housing is subjected to significantly less operational wear than the gears and can therefore be manufactured of a low-cost, easily workable material, such as diecast aluminum. According to the present invention, the coefficient of thermal expansion of the gears disposed in the housing can then be adapted to the coefficient of thermal expansion of the housing by a corresponding admixing of aluminum powder to the Al/Si starting material.

The Al/Si alloy powder used as the starting material is obtained by spray compacting. The Si content is expediently between 23% and 28%. In addition to aluminum, the alloy powder can contain admixtures of Mn, Mg, Ni, Cu as well as further metallic additions. If favorable process parameters are selected, intermetallic compounds and Si primary crystals are created in the spray-compacting process which have a size between 2 μm and 15 μm and which ensure a high resistance to wear and a low abrasion of the workpieces manufactured from this starting material.

In addition to the adaptation of the thermal expansion of the gear to that of the housing, the addition of aluminum powder to the Al/Si alloy has the further advantage of an easier formability and a higher stability of the gears. During the compressing, the soft, easily-formable granules of pure aluminum adapt closely to hard crystal grains contained in the Al/Si powder during the compression and reduce particularly the mutual mechanical anchoring of the Si primary crystals contained in the Al/Si starting material. The created, compressed green part therefore has a higher spatial density and a higher stability than a comparable compressed green part produced without the addition of aluminum.

A particularly high saving of costs can be achieved when producing the oil pump gear according to the present invention, and a contribution to an environmentally-friendly production can be made, if an Al/Si alloy powder is used as the starting material which occurs as a waste product within the scope of the production of cylinder liners by spray compacting. The manufacturing of oil pump gears according to the present invention therefore corresponds to a recycling of materials which occur as "overspray" of the cylinder liner blanks.

For ensuring a high resistance to abrasion of the gears, it is expedient to increase the surface hardness of the tooth surfaces after the calibration of the sintered blanks in that the Si primary crystals are exposed on the tooth surfaces by removing aluminum.

Other objects, advantages and novel features of the present invention will become apparent from the following detailed description of the invention when considered in conjunction with the accompanying drawings.

BRIEF DESCRIPTION OF THE DRAWINGS

The sole FIGURE illustrates an external-gear oil pump that contains two oil pump gears according to the present invention.

DETAILED DESCRIPTION OF THE DRAWINGS

The oil pump 1 is used for supplying oil to a motor vehicle engine. The housing 3 of the oil pump 1 is diecast aluminum and is part of the cylinder block of the engine. The oil pump gears 2 transport the oil from the suction space 4 into the pressure space 5. In the process, a return flow of the oil occurs at the gaps 6 between the oil pump gears 2 and the interior wall 7 of the housing, which return flow is larger as these gaps 6 are wider. In order to achieve return flow losses which are as low as possible and an effectiveness of the oil pump 1 which is as high as possible, the gaps 6 must therefore as small as possible in the entire operating temperature range of the oil pump 1. For this purpose, the thermal expansion of the oil pump gears 2 must be adapted as precisely as possible to the thermal expansion of the housing 3.

In the present embodiment, the starting material for producing the oil pump gears 2 is a hypereutectic Al/Si alloy powder which contains approximately 25 weight percent Si. The Al/Si alloy powder is obtained by a spray compacting process. In this case, the constituents present in a molten mass are pulverized to fine droplets by a spraying device in a controlled atmosphere.

Particularly, an Al/Si alloy powder can be used as the starting material for manufacturing oil pump gears 2 which occurs as waste in the form of overspray during the manufacturing of cylinder liners by spray compacting. The grain size of this Al/Si alloy powder is approximately 150 $\mu$m. The Si primary crystals contained in the Al/Si alloy powder have a median granule diameter of between 2 $\mu$m and 15 $\mu$m and are embedded in a matrix of an aluminum alloy.

The Al/Si alloy powder is mixed with approximately 30% pure aluminum powder and is compressed to green compacts of the oil pump gears. This takes place by cold pressing at room temperature or, as an alternative, by hot pressing at temperatures up to 150° C. In this case, the powder mixture to be compressed is expediently held in a controlled atmosphere. Furthermore, it is found to be expedient to additionally mix the mixture of aluminum powder and Al/Si alloy powder with a sliding medium, which prevents the formation of an oxide skin on the surface of the aluminum grains and ensures an easier sliding of the aluminum grains. During the pressing operation, the aluminum granules cling closely to the Al/Si alloy grains and fill the spaces between the alloy grains, thereby contributing to the fact that, during the pressing, a green compact is achieved which has a high density. The residual porosity of the completely compressed green compact is between 5% and 10%.

Subsequently, the green compact is sintered to further increase the stability of the oil pump gear. The sintering temperature is at approximately 500° C. and is selected such that the material of the oil pump gear assumes a pulpy consistency, but the spray-compacted granule structure is not destroyed. Then the oil pump gear is calibrated in order to achieve a highly precise dimensioning of the critical sizes of the gear (diameter, width, tooth shape). Finally, the aluminum on the surface of the oil pump gears is removed, whereby the Si primary crystals are exposed and the frictional characteristics of the gears are improved. The thus created oil pump gears 2 are finally inserted into the pump housing 3.

As a result of the above-described addition of the aluminum powder to the Al/Si powder as the starting material, oil pump gears 2 are produced whose coefficient of thermal expansion comes very close to that of diecast aluminum. Thus, in the operation of the oil pump 1, the oil pump gears 2 experience a similar thermal expansion as the housing 3, and the gaps 6 between the gears 2 and the housing 3, whose minimal value is designed for a very low temperature of −40° C., are so small at high operating temperatures of up to 120° C. that only slight return flow losses occur.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for manufacturing an oil pump gear, comprising:

admixing a spray-compacted Al/Si alloy powder that is a waste material from manufacturing cylinder liners, and unalloyed Al powder to form a mixture;

pressing the mixture to form an unmachined part of the oil pump gear; and sintering the unmachined part.

2. A process according to claim 1, wherein the mixture comprises 25 to 35 wt. % of the unalloyed Al powder.

3. A process according to claim 1, wherein the Al/Si alloy powder has an Si content of between 23 and 28 weight percent, and has Si primary crystals having a median grain diameter of from 2 $\mu$m to 15 $\mu$m.

4. A process according to claim 3, further comprising, after the sintering, exposing Si primary crystals on gear tooth surfaces by removing aluminum.

5. An oil pump produced according to the process of claim 1.

6. An engine comprising the oil pump of claim 1, wherein a pump housing is part of an engine cylinder block and is diecast aluminum.

7. An engine according to claim 6, wherein a coefficient of thermal expansion of oil pumps gears is substantially the same as a coefficient of thermal expansion of the pump housing.

* * * * *